(12) United States Patent
Kisanuki

(10) Patent No.: US 7,574,658 B2
(45) Date of Patent: Aug. 11, 2009

(54) STATE DISPLAY APPARATUS, MANAGEMENT SYSTEM AND COMPUTER-READABLE RECORDING MEDIUM IN WHICH PROGRAM FOR CONTROLLING STATE DISPLAY IS STORED

(75) Inventor: Kazumi Kisanuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 103 days.

(21) Appl. No.: 11/136,490

(22) Filed: May 25, 2005

(65) Prior Publication Data

US 2006/0173557 A1  Aug. 3, 2006

(30) Foreign Application Priority Data

Feb. 3, 2005  (JP)  ............................. 2005-027540

(51) Int. Cl.
*G06F 15/177* (2006.01)
*G06F 15/173* (2006.01)
*G06F 11/00* (2006.01)
*G06F 3/12* (2006.01)
*G05B 11/01* (2006.01)
*G08B 3/00* (2006.01)
*G08B 5/00* (2006.01)
*G08B 7/00* (2006.01)

(52) U.S. Cl. ........................... 715/736; 700/17; 700/27; 709/223; 714/4; 340/691.6; 358/1.15

(58) Field of Classification Search ................ 700/12, 700/17, 19, 21, 23, 27, 83, 108; 340/3.7, 340/3.71, 3.43, 3.44, 691.1, 691.6; 702/182–186; 358/1.15; 715/744, 736; 714/4, 47; 709/208, 709/220, 223; 399/27

See application file for complete search history.

(56) References Cited

U.S. PATENT DOCUMENTS

| | | | | |
|---|---|---|---|---|
| 5,353,399 | A * | 10/1994 | Kuwamoto et al. | ......... 715/736 |
| 5,699,494 | A * | 12/1997 | Colbert et al. | ............. 358/1.15 |
| 5,727,135 | A * | 3/1998 | Webb et al. | ................ 358/1.14 |
| 6,232,968 | B1 * | 5/2001 | Alimpich et al. | ............ 715/744 |
| 6,490,052 | B1 * | 12/2002 | Yanagidaira | ................ 358/1.15 |
| 6,618,163 | B1 * | 9/2003 | Roosen et al. | ............. 358/1.15 |
| 6,681,349 | B2 * | 1/2004 | Sekizawa | ...................... 714/47 |
| 6,709,176 | B2 * | 3/2004 | Gotoh et al. | .................. 400/61 |
| 7,061,391 | B2 * | 6/2006 | Hopper et al. | ........... 340/691.1 |

(Continued)

FOREIGN PATENT DOCUMENTS

EP  1434387 A1 *  6/2004

(Continued)

*Primary Examiner*—Crystal J Barnes-Bullock
(74) *Attorney, Agent, or Firm*—Staas & Halsey LLP

(57) ABSTRACT

A state display apparatus includes a function data obtaining section to obtain function data concerning a function of possessed by the electronic device through the communication network; a state data obtaining section to obtain state data indicating the state of the electronic device through the communication network; and a display controller to display, on the basis of the state data obtained by the state data obtaining section, information concerning the state of the electronic device on the monitor, using the function data. With this apparatus, even when an electronic device with a novel function is newly connected to the network, the system manger need not undergo a complex capturing of the function data of the electronic device, so that the apparatus provides improved convenience.

9 Claims, 17 Drawing Sheets

U.S. PATENT DOCUMENTS

| | | | |
|---|---|---|---|
| 7,088,929 B2 * | 8/2006 | Ahn | 399/27 |
| 7,124,177 B2 * | 10/2006 | Watanabe | 709/223 |
| 7,162,516 B2 * | 1/2007 | Hashimoto et al. | 709/208 |
| 7,301,662 B2 * | 11/2007 | Mifune | 358/1.15 |
| 7,412,498 B2 * | 8/2008 | Machida | 709/220 |
| 2001/0034852 A1 * | 10/2001 | Kawashima | 714/4 |
| 2002/0030840 A1 * | 3/2002 | Itaki et al. | 358/1.13 |
| 2002/0033964 A1 * | 3/2002 | Suzuki et al. | 358/1.15 |
| 2003/0063310 A1 * | 4/2003 | Nguyen et al. | 358/1.15 |

FOREIGN PATENT DOCUMENTS

| | | |
|---|---|---|
| JP | 2-158827 | 6/1990 |
| JP | 4-344693 | 12/1992 |
| JP | 4-361353 | 12/1992 |
| JP | 8-179910 | 7/1996 |
| JP | 2000-315182 | 11/2000 |
| JP | 2002-214972 | 7/2002 |
| JP | 2004-110370 | 4/2004 |
| JP | 2005031732 A * | 2/2005 |

* cited by examiner

FIG. 2

| PRINTER MODEL | IP ADDRESS | COMMUNITY NAME | MAC ADDRESS | STATUS | PRINTER NAME | PRINTER LOCATION |
|---|---|---|---|---|---|---|
| XL-5730 (Ver 1.20) | | public | | POWER-SAVE MODE | XL-5730_AKASHI | XXXX DEVELOPMENTAL OFFICE |
| XL-5330 (Ver 1.25) | | public | | POWER-SAVE MODE | | |
| XL-6700 (Ver 1.20) | | public | | POWER-SAVE MODE | | |
| XL-6300 (Ver 0.00) | | public | | READY FOR PRINTING | XL-6200 | OFFICE |
| XL-6200 (Ver 1.16) | | public | | | | |

FIG. 6

| ICON | SIMPLE INDICATOR | DETAILED INDICATOR |
|---|---|---|
|  | [ONLINE] | |
|  | [PRINTING…] | |
|  | [ONLINE (CONSUMABLE REPLACEMENT)] | CONSUMABLE SHOULD BE REPLACED SHORTLY |
|  | [COVER OPEN] | DOUBLE-SIDE PRINTING UNIT COVER IS OPENING |
|  | [NO CARTRIDGE] | PROCESS CARTRIDGE IS NOT CORRECTLY SET |
|  | [NO PAPER] | NO DESIGNATED PAPER (A4) AVAILABLE |
|  | [PAPER JAM] | PAPER JAM OCCURS AT OUTPUT |
|  | [HARDWARE ERROR] | HARDWARE ERROR OCCURS |
|  | [COMMUNICATION ERROR] | ABNORMAL COMMUNICATION TO PRINTER |

PRIOR ART

FIG. 9

| STATE | ICON | |
|---|---|---|
| ONLINE | online.ico | ◎ |
| PRINTING | printing.ico | ● |
| COVER OPEN | coveropen.ico | ◇ |
| PAPER JAM | jam.ico | ★ |
| NO PAPER | nopaper.ico | □ |

PRIOR ART

FIG. 10
| CONFIGURATION | GRAPHIC |
|---|---|
| SINGLE CASSETTE | casset1.bmp 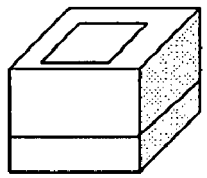 |
| DOUBLE CASSETTES | casset2.bmp 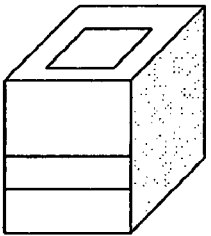 |
PRIOR ART

PRIOR ART

111

PRIOR ART

110

PRIOR ART

111

PRIOR ART

FIG. 15

| STATE | ICON | |
|---|---|---|
| ONLINE | online.ico | ◎ |
| PRINTING | printing.ico | ● |
| COVER OPEN | coveropen.ico | ◇ |
| PAPER JAM | jam.ico | ★ |
| NO PAPER | nopaper.ico | □ |
| TRAY FULL | trayfull.ico | ■ |

PRIOR ART

FIG. 16
| CONFIGURATION | GRAPHIC |
|---|---|
| SINGLE CASSETTE | casset1.bmp 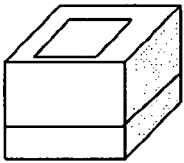 |
| DOUBLE CASSETTES | casset2.bmp 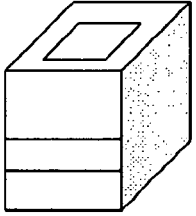 |
| STACKER TRAY | sta.bmp 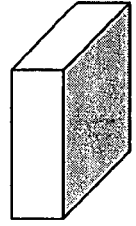 |
PRIOR ART

112

PRIOR ART

STATE DISPLAY APPARATUS, MANAGEMENT SYSTEM AND COMPUTER-READABLE RECORDING MEDIUM IN WHICH PROGRAM FOR CONTROLLING STATE DISPLAY IS STORED

BACKGROUND OF THE INVENTION

1. Field of the Invention

The present invention relates to a technique for a system and an apparatus to display a state of and a function possessed by an electronic device, such as a printer, communicably connected thereto through a communication network.

2. Description of the Related Art

Recently, a management system for managing output devices, such as printers, connected to a network (e.g., a LAN (Local Area Network)) has been known to the public.

For example, Japanese Patent Applications Laid-Open (KOKAI) NO 2004-110370 and 2000-315182 disclose techniques for monitoring a state and function of a device connected to a network and for easily recognizing the entire configuration of a network system.

Such a management system displays a list of printers connected to the network and an icon representing the operation state of each of the printers which state is received from the corresponding printer on a monitor included in a management server, so that it is possible to remotely manage states of a number of printers connected to a network and determine environmental settings of the printers. For improvement in user interfaces, a management system may display information concerning a detailed configuration such as whether or not a printer has an optional function.

Accompanying drawing FIG. 8 schematically shows a conventional management system 100 including a PC (Personal Computer) 101, a printer 102 (printer 1), a printer 103 (printer 2) and a network 104. Management software installed in the PC 101 manages states of the printers 101 and 102 and determines environmental settings of the printers 102 and 103.

Accompanying tables FIGS. 9 and 10 are examples of definition information (information definition files) used in the management system 100. The definition information shown in FIG. 9 correlates various states of the printer 102 with icons, and more specifically correlates states of the printer 102, icons indicating the states, and file names of the icons with one another. The example of FIG. 9 shows five icons, each indicating one of the states of "online", "printing", "cover open", "paper jam" and "no paper".

For convenience of explanation, icons indicating various states of the printer 102 take the form of a double circle, a black circle and other patterns in the example of FIG. 9. On an actual display, the icons take the form of graphics by which the system manager, that is the user, can visually recognize each state of the printer 102.

The definition information shown in FIG. 10 correlates configurations of the printer 102 with aspect illustrations of the printer, and more particularly, correlates configurations of the printer 102, data of images schematically illustrating the configurations, and file names of the image data with one another. The example shown in FIG. 10 includes data (cassette1.bmp) of an image illustrating the printer 102 with a single sheet-feeding cassette and that (cassette2.bmp) with double cassettes.

The management system 100 previously prepares definition information, exemplified by FIGS. 9 and 10, concerning the printers 102 and 103 and stores the information in the PC 101. In the PC 101, the management software displays such definition information in the form of various screens on a non-illustrated monitor.

Accompanying tables FIGS. 11 and 12 are examples of screens displayed in the conventional management system 100; FIG. 11 is an example of a printer list display screen and FIG. 12 is an example of a printer configuration information screen concerning the printer 102.

The printer list display screen 110 shown in FIG. 11 correlates an icon, a printer name and a state of the same printer with one another. The system manager can confirm the states (e.g., during online connection) of the printers 102 and 103 connected to the network 104 with a glance at the printer list display screen 110.

Further, the printer configuration information screen 111 includes image data of a perspective view schematically illustrating an aspect of the printer 102 and text data indicating a state and functions of the printer 102. The example shown in FIG. 12 indicates that the printer 102 includes a single sheet-feeder cassette for A4 size paper and displays a state in which a facedown tray is correctly functioning besides a perspective view having a single sheet-feeding cassette.

The system manager or the like refers to the printer configuration information screen 111 and confirms functions (e.g., an available sheet size) possessed by the printer 102 connected to the management system 100 through the network 104 and a more detailed state (e.g., a state of the facedown tray) of the printer 102.

In the conventional management system 100 described above, data of images and icons indicating states of the printers 102 and 103 are previously stored as an information definition file in the PC 101. The PC 101 obtains state data indicating states of the printers 102 and 103 on the network 104 from the printers through a protocol such as SNMP (Simple Network Management Protocol).

However, the conventional management system 100 selects image data and icons that are to be displayed on the monitor and that correspond to the state data obtained from the printers 102 and 103 among data of various images and icons which data is previously stored in the PC 101 so that the icons and the like reflect the states of the printers 102 and 103. For this purpose, the management system 100 has to correlate possible states and functions of each printer with definition information (i.e., image data, icons and the like) in advance. Concerning configuration and functions, such as mounting an option, of each printer, the management system 100 has to prepare definition information corresponding to the configuration and functions in the management system 100 beforehand.

Accompanying drawing FIGS. 13 and 14 illustrate examples of screens to be displayed when a new printer (a printer 3) with a novel function is connected to the network 104 in the conventional management system 100; more specifically, FIG. 13 shows an example of a printer list display screen and FIG. 14 illustrates an incorrect printer configuration information screen concerning the printer 3.

The management software cannot display an icon and a perspective view of the printer 3 because definition information for the printer 3 is not stored in the PC 101, on a printer list display screen 110 and the printer configuration information screen 111 as shown in FIGS. 13 and 14, and the icon and the perspective view are substituted for an incorrect information such as an icon "?" (FIG. 13) indicating that a corresponding icon is not registered or an image of a different printer (FIG. 14).

The system manager installs definition information concerning the new printer 3 into the PC 101 or updates (versions up) the management software supposable the printer 3, so that the management software displays the correct state and functions of the printer 3.

Accompanying drawing FIGS. 15 and 16 are examples of definition information of the printer 3. The definition information of FIG. 15 correlates states of the printer 3 and icons, and that of FIG. 16 correlates the configuration of the printer 3 with an illustration of the printer. Accompanying drawing FIG. 17 is an example of a correct printer configuration information screen concerning the printer 3.

The printer 3 possesses a function for sending and notifying a state of tray full, which function is not possessed by the printers 102 and 103. As shown in FIG. 15, the definition information retains an icon and a file name indicating the tray-full state in association with the tray-full state, so that a correct icon concerning the printer 3 is displayed in the printer list display screen 110 exemplified by FIG. 13.

The printer 3 is capable of mounting an optional stacker tray, which the printers 102 and 103 do not include, thereon. As shown in FIG. 16, the definition information for the printer 3 retains data of the perspective diagram schematically illustrating an aspect of the stacker tray and the file name of the data in correlation with the function of the stacker tray and thereby the printer configuration information screen 111 displays a correct aspect of the printer 3 on which the stacker tray is mounted as shown in FIG. 17.

Namely, in the conventional management system, establishment of connection of a printer with a novel function forces the system manager to perform a complicated task of updating (version up) the management software installed in the PC 101 or of capturing an information definition file (function data) concerning the new printer in order to support the new printer.

The above-described management software is generally installed in a server or a terminal unit operated by the system manager. The system manager or an equivalent is reluctant to update (install) the management software in the server or the terminal because a restart of the OS (Operating System) resulting from the updating may affect the system in operation.

SUMMARY OF THE INVENTION

With the foregoing problems in view, the object of the present invention is to realize management of a state of an electronic device with a novel function that is newly connected to a communication network, in which management the manager does not have to undergo a complex capturing of function data of the electronic device, so that it is possible to improve convenience.

To attain the above object, as a first generic feature of the present invention, there is provided a state display apparatus for displaying a state of an electronic device which is communicably connected to the apparatus through a communication network on a monitor, comprising: a function data obtaining section to obtain function data concerning a function possessed by the electronic device from the electronic device through the communication network; a state data obtaining section to obtain state data indicating the state of the electronic device from the electronic device through the communication network; and a display controller to display, on the basis of the state data obtained by the state data obtaining section, information concerning the state of the electronic device on the monitor, using the function data.

As a preferable feature, the state display apparatus may further comprise: a management section to manage at least the function of the electronic device connected to the apparatus through the communication line; a connection recognizing section to recognize a connection of the electronic device to the apparatus through the communication network; and a judging section to judge whether or not the management section manages an electronic device identical to the first electronic device the connection of which has been recognized by the connection recognizing section, and if the result of the judging by the judging section is negative, the function data obtaining section may obtain the function data concerning a function possessed by the first electronic device from the first electronic device.

As another preferable feature, the state display apparatus may further comprise a retaining section to retain the function data obtained by the function data obtaining section, and the display controller may display the information concerning the state of the electronic device on the monitor, using the function data retained in the retaining section.

As an additional preferable feature, the function data may include data of images that schematically illustrate a function and a state of the electronic device.

As a further preferable feature, the electronic device may be an output device.

As a second generic feature, there is provided a management system in which a state management apparatus manages a state of an electronic device which is communicably connected to the state management apparatus through a connection network, comprising: the electronic device including a function data retaining section to retain function data concerning a function possessed by the electronic device, a function data sending section to send the function data retained in the function data retaining section to the state management apparatus, and a state data sending section to send state data indicating the state of the electronic device to the state management apparatus; and the state management apparatus including a monitor to display information concerning the state of the electronic device, a function data obtaining section to receive the function data sent from the electronic device through the communication network, a state data obtaining section to receive the state data indicating the state of the electronic device from the electronic device through the communication network, and a display controller to display, on the basis of the state data received by the state data obtaining section, information concerning the state of the electronic device on the monitor, using the function data.

As a preferable feature, the state management apparatus may further include: a management section to manage at least the function of the electronic device connected to the apparatus through the communication line; a connection recognizing section to recognize a connection of the electronic device to the apparatus through the communication network; and a judging section to judge whether or not the management section manages an electronic device identical to the first electronic device the connection of which has been recognized by the connection recognizing section, if the result of the judging by the judging section is negative, the function data obtaining section may obtain the function data concerning a function possessed by the first electronic device from the first electronic device.

As another preferable feature, the state management apparatus may further include a retaining section to retain the function data obtained by the function data obtaining section, the display controller may display the information concerning the state of the electronic device on the monitor, using the function data retained in the retaining section.

As an additional preferable feature, the function data may include data of images that schematically illustrate a function and a state of the electronic device.

As a further preferable feature, the electronic device may be an output device.

As a third generic feature of the present invention, there is provided a computer-readable recording medium in which a program for controlling state display so that a state of an electronic device which is communicably connected to a computer through a communication network is displayed on a monitor, wherein the program instructs the computer to function as: a function data obtaining section to obtain function data concerning a function possessed by the electronic device from the electronic device through the communication network; a state data obtaining section to obtain state data indicating the state of the electronic device from the electronic device through the communication network; and a display controller to display, on the basis of the state data obtained by the state data obtaining section, information concerning the state of the electronic device on the monitor, using the function data.

As a preferable feature, the program for controlling state display may instruct the computer to further function as: a management section to manage at least the function of the electronic device connected to the apparatus through the communication line; a connection recognizing section to recognize a connection of the electronic device to the apparatus through the communication network; and a judging section to judge whether or not the management section manages an electronic device identical to the first electronic device the connection of which has been recognized by the connection recognizing section, if the result of the judging by the judging section is negative, the function data obtaining section obtaining the function data concerning a function possessed by the first electronic device from the first electronic device.

As another preferable feature, the function data may include data of images that schematically illustrate a function and a state of the electronic device.

As an additional preferable feature, the electronic device may be an output device.

For management of states of electronic devices, even when an electronic device having a novel function is newly connected to the communication network, the present invention can eliminate a burden of capturing function data of the new electronic device from the system manager, whereupon it is possible to enhance convenience.

The function data sending section of the new electronic device sends function data concerning the novel function possessed by the electronic device to the management apparatus, and the state display apparatus (the state management apparatus) obtains the sent function data. Subsequently, on the basis of the state data received by the state data obtaining section, the display controller displays the information concerning the state of the electronic device on the monitor, using the function data. As a result, manufacturers that provide the state display apparatus (the management system, a program for controlling state display) do not have to update the program for controlling state display to catch up with a novel function each time a printer with a novel function is put on the market, so that it is possible to cost for development and maintenance.

Other objects and further features of the present invention will be apparent from the following detailed description when read in conjunction with the accompanying drawings.

BRIEF DESCRIPTION OF THE DRAWINGS

FIG. 2 is a table showing an example of a printer list screen displayed on a monitor of the management system of FIG. 1;

FIG. 6 is a diagram illustrating other examples of a status information display field displayed on the monitor of the management system of FIG. 1;

FIGS. 9 and 10 are tables respectively showing examples of definition information used in the conventional management system of FIG. 8;

FIGS. 15 and 16 are tables illustrating examples of definition information concerning a printer.

DESCRIPTION OF THE PREFERRED EMBODIMENTS

Hereinafter, an embodiment of the present invention will now be described with reference to the accompanying drawing.

(A) First Embodiment

Figure 1:
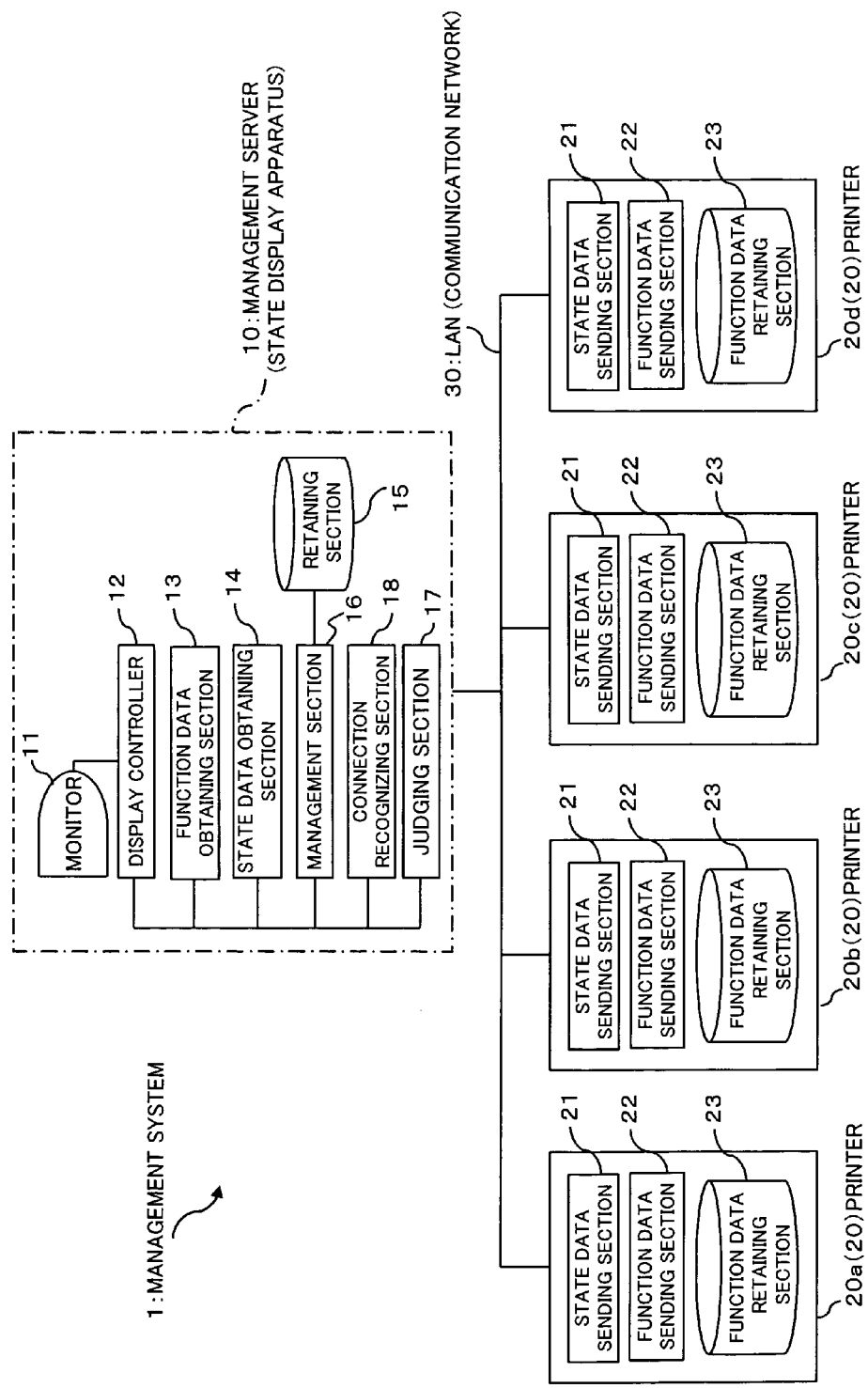
FIG. 1 is a block diagram schematically showing the entire configuration of a management system according to a first embodiment of the present invention.

FIG. 1 is a block diagram showing the entire configuration of a management system according to the first embodiment of the present invention. A management system 1 manages a number of printers (electronic devices, output devices) 20a, 20b, 20c and 20d which are communicably connected thereto through a LAN (a communication network) 30, and more specifically manages the states of the printers and determines environmental settings and the like of the printers. The present management system 1, as shown in FIG. 1, includes a management server (a state display apparatus) 10, the LAN 30, and a number (four in the first embodiment) of printers 20a, 20b, 20c and 20d.

Each of the printers 20a, 20b, 20c and 20d is communicably connected to the management server 10 through the LAN 30 and carries out various print operations (various outputs) under control of a non-illustrated print server.

In the illustrated example, of the four printers 20a, 20b, 20c and 20d shown in FIG. 1, the three printers 20a, 20b and 20c may be of the same type (model) or at least one of the three maybe different from the other two. Meanwhile, it is assumed that the printer 20d possesses a function (e.g., function for tray-full notification, or a stacker tray) which is not possessed by any of the other printers 20a, 20b and 20c.

Hereinafter, a particular one of the printers is identified by the reference number 20a, 20b, 20c or 20d, but an arbitrary printer is identified by a reference number 20.

Each printer 20, as shown in FIG. 1, includes a state data sending section 21, a function data sending section 22 and a function data memory 23.

The state data sending section 21 of a printer 20 sends state data indicating a state of the printer 20 in question to the management server 10 through the LAN 30. In the management system 1, state data represents, for example, the printer model name, the firmware version, the memory (RAM) size, a print enable state, a power-save mode, during printing, online, a warning against consumable replacement, cover open, no cartridge, sheet remaining capacity, no sheet, state of output, paper jam, hardware error, and communication error. Namely, the state data sending section 21 sends various data concerning a state of the printer 20 in question, as state data indicating the printer state, to the management server 10 from the printer 20.

In the first embodiment, state data includes data (option possession data) representing a state of possession of an optional function in the printer 20. The option possession data that is to be sent to the management server 10 from the printer 20 includes various states of "a double-side printing unit is mounted (double-side printing unit mounted)", "an extension stacker unit is mounted (extension stacker mounted)", "an offset output function is available (offset output function available)", "function for printing sorting into each copy is available (sort function available)", "a finisher is mounted (finisher mounted)".

Alternatively, the state data sending section 21 may send data of the above various states to the management server 10 responsive to a state data request made (sent) from the management server 10 (state data obtaining section 14 that is to be detailed described later). Otherwise, if a printer 20 undergoes a change in a state, such as paper run-out or paper jam, the state data sending section 21 may spontaneously send state data concerning the corresponding state to the management server 10.

The function data memory 23 of a printer 20 retains function data concerning functions possessed by the corresponding printer 20. Function data is represented by definition information (an information definition file) shown in FIGS. 15 and 16. The definition information in the illustrated example correlates a state of a printer 20 with an icon (see FIG. 15) and correlates a configuration of a printer 20 with an aspect of the printer 20 (see FIG. 16), so that the definition information includes data of images that schematically illustrate functions and states of a printer 20.

The data of images, for example, includes data of icons (see FIG. 15) which correspond to state data (various states) that the state data sending section 21 notifies to the management server 10 and data of perspective views which correspond to option unit data (various functions) that the state data sending section 21 notifies to the management server 10.

The function data sending section 22 sends the management server 10 function data that is stored in the function data retaining section 23. The function data sending section 22 may send the function data to the management server 10 in response to a function data request (a command of request for an information definition file) from the management server 10 (a function data obtaining section 13 to be detailed described later) or may spontaneously send the function data to the management server 10.

The function data sending section 22 sends (provides) the function data to the management server 10 responsive to a request for sending function data which request is issued from the function data obtaining section 13 of the management server 10 that is to be explained later, for example.

The management server (a state display apparatus, a state management apparatus) 10 manages each printer 20 that is communicably connected to the management server 10 through the LAN 30. The management server 10 is realized by a normal personal computer including a monitor 11, a display controller 12, a function data obtaining section 13, a state data obtaining section 14, a retaining section 15, a management section 16, a judging section 17 and a connection recognizing section 18 as shown in FIG. 1.

In this case, the functions for the display controller 12, the function data obtaining section 13, the state data obtaining section 14, the management section 16, the judging section 17 and the connection recognizing section 18 are realized by a CPU (Central Processing Unit) executing a certain program (a program for controlling state display).

The program (the program for controlling state display) for realization of the functions for the display controller 12, the function data obtaining section 13, the state data obtaining section 14, the management section 16, the judging section 17 and the connection recognizing section 18 is provided in a recorded form in a computer-readable recording medium exemplified by a flexible disk, a CD (a CD-ROM, a CD-R, a CD-RW or the like), a DVD (a DVD-ROM, a DVD-RAM, a DVE-R, a DVD-RW, a DVD+RW or the like), a magnetic disk, an optical disk, an magneto-optic disk or the like. The computer reads the program from the recording medium, forwards the read program to an internal or external memory to store the program in the memory, and executes the program. Alternatively, the program may be stored in a memory (a recording medium) such as a magnetic disk, an optical disk or a magneto-optic disk and may be sent to the computer from the memory through a communication network.

In order to realize the functions for the display controller 12, the function data obtaining section 13, the state data obtaining section 14, the management section 16, the judging section 17 and the connection recognizing section 18, the program stored in an internal memory (the RAM or ROM of a personal computer in this embodiment) is executed by a microprocessor (the CPU in this embodiment) of the personal computer. At that time, the personal computer may read and execute the program recorded in a recording medium.

The concept of a computer in this embodiment includes hardware and an OS (Operating System) and means hardware that operates under control of the OS. If an application program independently operates hardware, requiring no OS, the hardware itself corresponds to a computer. Hardware includes at least a microprocessor such as a CPU and means for reading a computer program recorded in a recording medium. In the first embodiment, the management server 10 possesses a function as a computer.

Further, the recording medium used in this embodiment may be one from various computer-readable recording mediums in the form of an IC card, a ROM cartridge, a magnetic tape, a punch card, an internal memory (such as a RAM or a ROM) in a computer, an external memory, or a printed matter on which codes such as bar codes are printed, other than the above examples of a flexible disk, a CD, a DVD, a magnetic disk, an optical disk or a magneto-optical disk.

The monitor 11 displays various data thereon, is formed by, for example, a LCD (Liquid Crystal Display) or a CRT (Cathode-Ray Tube) display, and is controlled by the display controller 12 that is to be detailed described later.

The management section 16 manages at least a function of each printer 20 that is communicably connected to the management server 10 and more particularly manages the type of the printer 20, the functions (options) of the printer 20, the version of the ROM (the firmware) of the printer 20 and another factor. Specifically, the management section 16 uses a database (management software) in which data (type data) to specify the type of each printer 20, the version of ROM, the function data of the printer 20 which data is obtained by the function data obtaining section 13 are correlated with data to identify the printer 20 in order to manage various information pieces (management data) concerning the printer 20. This created database is stored into a hard disk, a memory or the like of the personal computer.

The data to identify a printer 20 may be an identifier unique to each printer 20 allocated by the management section 16, for example, or may be the MAC (Media Access Control) address of each printer 20 or the serial number of each printer 20.

The connection recognizing section 18 recognizes that a printer 20 establishes a connection to the management server 10 through the LAN 30, i.e., recognizes establishment of a direct or indirect connection of a printer 20 to the management server 10. The connection recognizing section 18 recognizes connection establishment of the printer 20 to the management server 10 through the LAN 30 by means of, for example, a plug-and-play function.

The judging section 17 judges whether or not the management section 16 manages a printer 20 identical to the printer 20 the established connection of which has been recognized by the connection recognizing section 18. Hereinafter, the first embodiment will be described with the assumption that the printer 20d shown in FIG. 1 is newly connected.

When the connection recognizing section 18 recognizes establishment of connection of the printer 20d to the LAN 30, the judging section 17 refers to the management section 16 (or a database managed by the management section 16) and judges whether or not the management section 16 manages a printer 20 identical to the newly connected printer 20d, i.e., judges whether or not the retaining section 15 retains data concerning a printer identical (in function) to the printer 20d.

In the first embodiment, an identical printer represents two or more printers identical in type and/or in function; the judging section 17 judges a printer the type of which is not managed by the management system 1 or a printer possesses a (new) function that is not managed by the management system 1 to be a non-identical printer.

The function data obtaining section 13 receives (obtains) function data concerning the functions possessed by each printer 20 from the printer 20 through the LAN 30. Specifically, if the judging section 17 judges that the management section 16 does not manage a printer 20 identical to the printer 20d the connection of which has been recognized by the connection recognizing section 18, the function data obtaining section 13 sends a command of request for a definition information file to the printer 20d in order to request that function information be sent to the management server 10. The function data obtaining section 13 then receives (obtains) function data sent from the function data sending section 22 of the printer 20d in response to the request.

The state data obtaining section 14 receives state data issued from each printer 20 through the LAN 30. More specifically, the state data obtaining section 14 periodically requests each printer 20 to send the state data obtaining section 14 state data and receives the function data sent from the printer 20.

The state data obtaining section 14 may send a printer 20 a request (for updating state data) issued from a system manager or the like at irregular intervals and, in response to the request, the printer 20 may send state data to the state data obtaining section 14. Alternatively, a printer 20 may arbitrarily send the state data obtaining section 14 the state data.

The retaining section 15 retains function data obtained by the function data obtaining section 13. The obtained function data is recorded in the form of a database or the like. For example, the retaining section 15 is formed by a harddisk or a memory (RAM: Random Access Memory) used for a computer.

The display controller 12 controls the monitor 11 in order to display various information pieces on the monitor 11, and, on the basis of the state data received (obtained) by the state data obtaining section 14, displays information concerning a function and/or a state of each printer 20 (information concerning a state) on the monitor 11, using the function data stored in the retaining section 15. More specifically, the display controller 12 displays a function and/or a state of each printer 20 on the monitor 11, using the data of icons and graphics stored in the retaining section 15.

FIG. 2 is a table of an example of a printer list screen 200a displayed on the monitor 11 in the management system 1 of the first embodiment.

In the management system 1, the display controller 12 displays the printer list screen 200a shown in FIG. 2 on the monitor 11. In this example shown in FIG. 2, the list has items of a printer model, an IP (Internet Protocol) address, a community name, a MAC address, a status, a printer name, and a printer location.

An item of a printer model represents a model (a type) of a printer and includes a check box 201 and a status icon 202.

A check box 201 indicates whether or not the printer in question is periodically monitored. A check box with a check mark (in the example of FIG. 2, a V-shape mark) indicates that the printer is periodically monitored; and a check box without a check mark represents a state in which the printer is not periodically monitored.

Direct clicking of a mouse (not shown) on a check box 201 switches a monitoring state. Namely, clicking a selected check box 201 checks off (cancels) the selection so that the printer 20 is not monitored any longer; and conversely, clicking a checked-off check box 201 selects the check box 201 and monitoring of the printer 20 begins.

A status icon 202 indicates a state of a printer 20 and can be varied in accordance with the state of the printer 20. For example, the example of FIG. 2 indicates that printers of model XL-5330 and XL-6300 are in the power-save mode and that consumables thereof should be replaced shortly, and uses an icon (overlaying a triangle enclosing an exclamation mark on an aspect of a printer), as a status icon 202, represents as such for these printers. However, although omitted in FIG. 2, a text indicating the state is put in the brackets "( )" attached to the field of a status.

An item of an IP address represents an IP address allocated to the printer 20 in question; an item of a community name represents a group set to each printer for management convenience; an item of a MAC address represents a MAC address set for the printer 20 in question; an item of a status indicates a state of the printer in question by means of text; an item of a printer name represents the name of the printer which name is previously allocated; and an item of a printer location indicates a location at which the printer 20 is placed.

The system manager can grasp the states of a number of printers 20 at a glance at printer list screen 200a.

Figure 3:
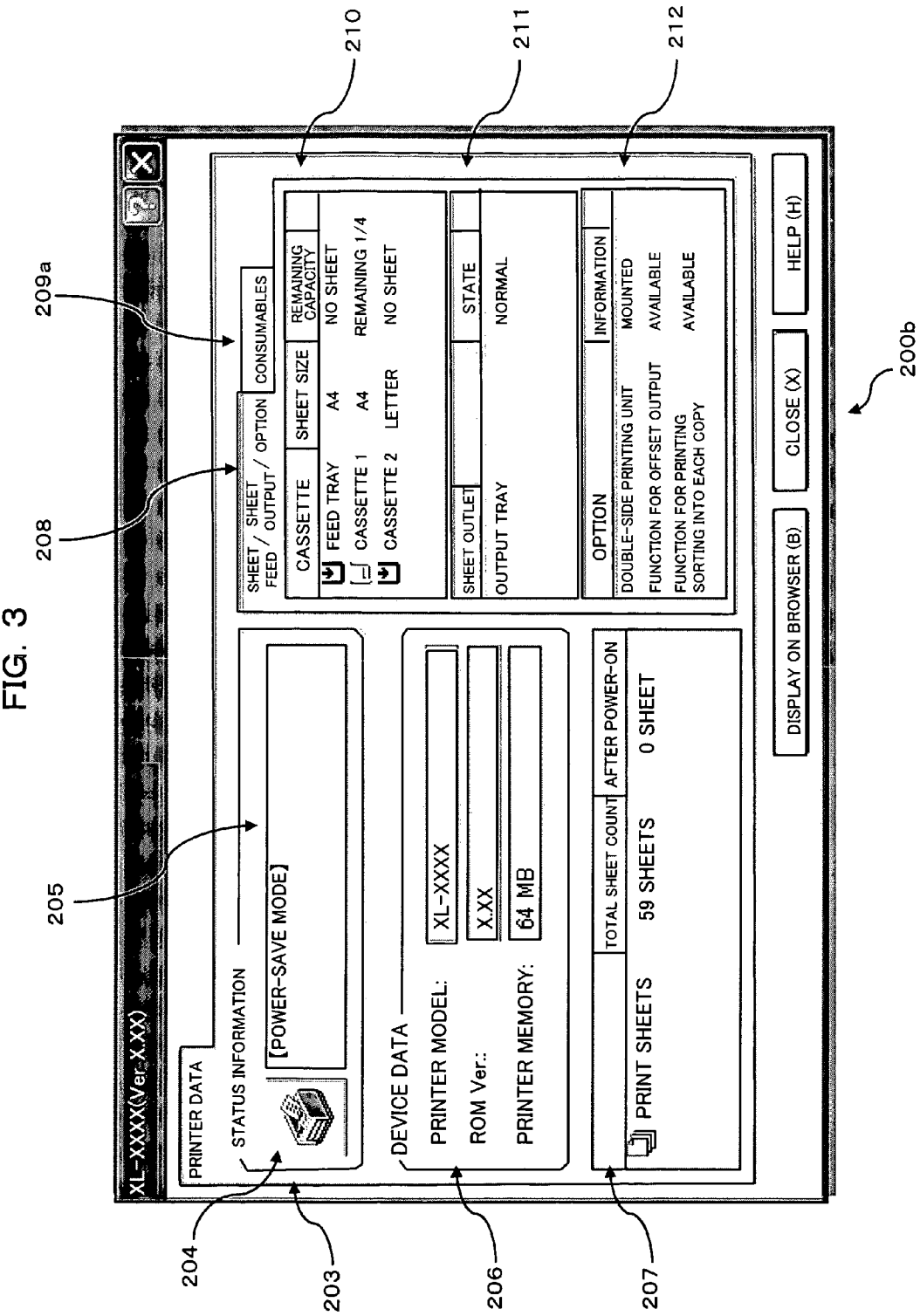
FIG. 3 is a diagram illustrating an example of a printer data page screen displayed on the monitor of the management system of FIG. 1.
Figure 4:
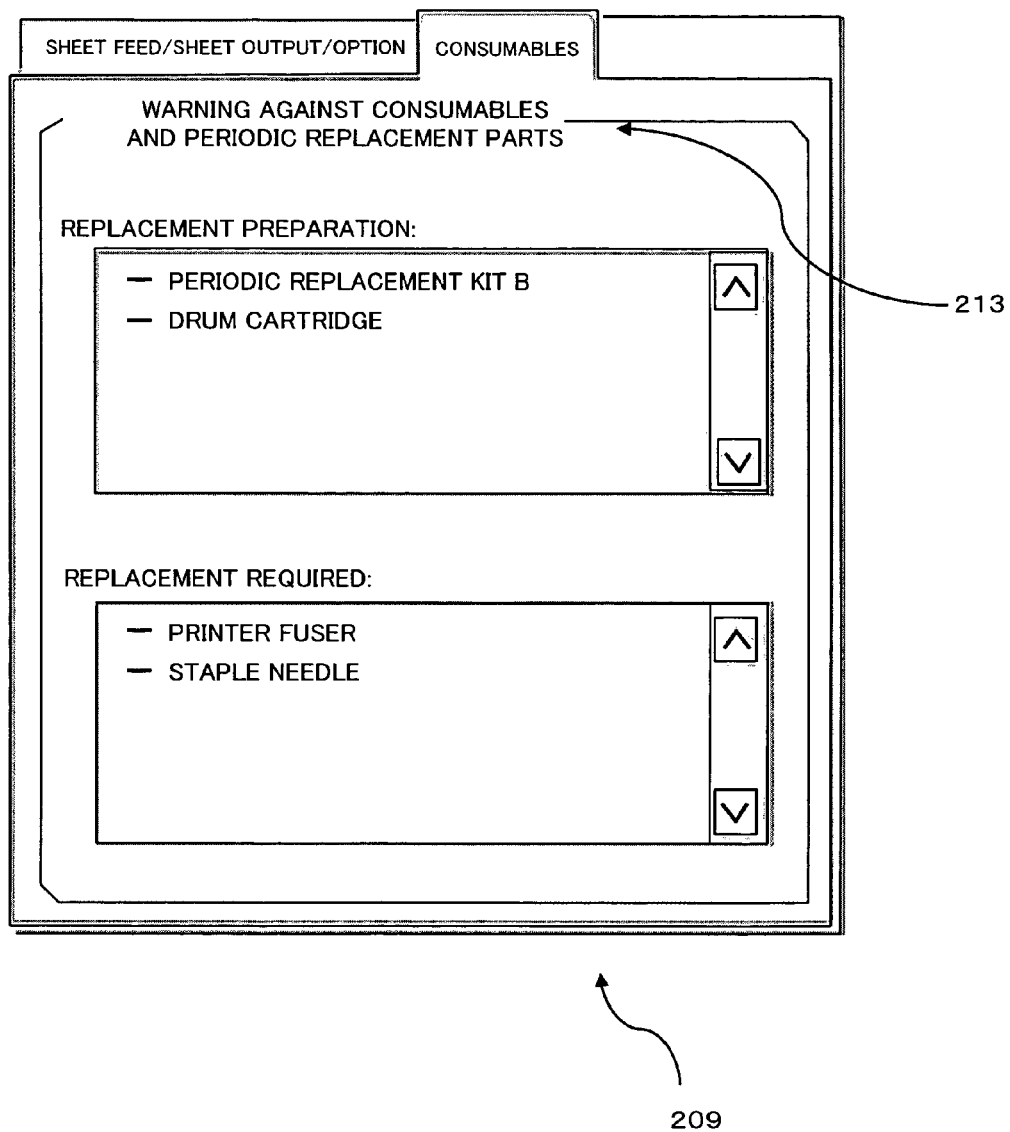
FIG. 4 is a diagram illustrating an example of a consumables information field of a printer data page screen displayed on the monitor of the management system of FIG. 1.
Figure 5:
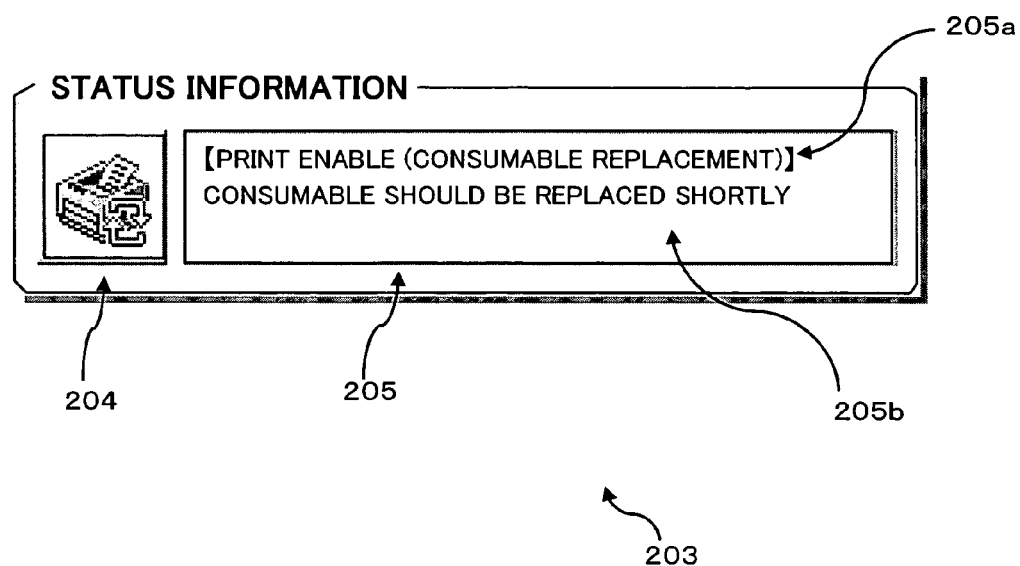
FIG. 5 is a diagram illustrating an example of a status information display field displayed on the monitor of the management system of FIG. 1.

FIG. 3 shows an example of a printer data page screen 200b displayed on the monitor 11 of the management system 1; FIG. 4 illustrates an example of a consumables information field 209 of a printer data page screen 200b; and FIG. 5 illustrates an example of a status information display field 203 displayed on the monitor 11 of the management system 1 of the first embodiment of the present invention.

In the printer list screen 200 shown in FIG. 2, the system manager selects a particular printer 20 via a mouse, and the display controller 12 displays the printer data page screen 200b exemplified by FIG. 3 on the monitor 11.

The printer data page screen 200b indicates individual data of a selected printer 20 and includes a status information field 203, a device data field 206, a printed sheet number field 207 and, a field 208 of sheet feed/sheet output/option tab data, as shown in FIG. 3.

The status icon 204 takes the form of a button (a status icon button). The system manager clicks the status icon 204 to issue a request for state data to the printer 20 and, on the basis of the state data sent from the printer 20 responsive to the request, updates the contents of the printer data page screen 200b to indicate the latest state.

The status information field 203 indicates a state of the printer 20 and includes a status icon 204 in the form of a graphic schematically illustrating a state (status data; an aspect) of the printer 20 and a status data screen 205 in the form of a text stating the state (the status data) of the printer 20.

The status data screen 205 includes a simple text display portion 205a which indicates a state of a printer 20 by an abbreviated text and a detailed text display portion 205b which indicates the state in detail by a text. The simple text display portion 205a is enclosed by brackets "[ ]" and is displayed from the first line in the status data screen as shown in FIG. 5 and the detailed text display portion 205b begins at the subsequent line to the simple text display portion 205a and indicates a more detailed state of the printer 20.

FIG. 6 shows other examples of data displayed in a status information display field 203 displayed on the monitor 11 of the management system 1 and correlates simple text data and detailed text data that are respectively displayed in a simple text display portion 205a and a detailed text display portion 205b with a status icon 204.

A status icon 204, simple text data and detailed text data exemplified in FIG. 6 are stored in the retaining section 15. The display controller 12 reads these data from the retaining section 15 and creates a printer data page screen 200b.

A device data field 206 displays a "printer model", a "ROM ver." and a "printer memory". A "ROM ver." indicates a firmware version of the printer 20 and a "printer memory" represents the capacity of a memory (RAM) mounted on the printer 20.

A printed sheet number field 207 indicates the number of sheets that the printer 20 has already printed and more specifically displays the number of total printed sheets and the number of printed sheets printed after power-on.

A field 208 of sheet feed/sheet output/option tab data includes a sheet feeder data field 210, a sheet output field 211 and an option data field 212.

A sheet feeder data field 210 displays state of sheet feeding function of the printer 20 and represents sheet size, amount of remaining sheets in each of the sheet feeding trays and sheet feeding cassettes mounted on the printer 20, using icons and texts. A sheet output field 211 displays a state of a sheet outputting function of the printer 20 and represents state (normal/abnormal) of sheet-output tray mounted on the printer 20.

A option data field 212 indicates the presence or absence of an optional unit mounted on the printer 20, which unit is exemplified by a double-side printing unit, a function of offset outputting, a function for printing sorting into each copy, an extension stacker unit, and a finisher. Specifically, the option data field 212 displays a mounted state of each option by the indicators "mounted/not-mounted" or "available/unavailable".

If the printer 20 supports data concerning consumables (has a function for consumables support), selection of a consumables tab 209a in a printer data page screen 200b shown in FIG. 3 displays a consumables data field 209 shown in FIG. 4 as a substitution for a field 208 of the sheet feed/sheet output/option.

A consumables data field 209 includes a field 213 for a warning against consumables and periodic replacement parts to notify a part for which replacement has to be prepared, and/or a part which requires replacement or the like. More specifically, warning messages against replacement preparation and against replacement for depleted consumables detected by the printer 20 are displayed on the field 213 for a warning against consumables. For example, a toner/process cartridge, a drum cartridge, and a staple needle, a printer fuser and a replacement kit are regarded as consumables and periodic replacement parts.

The above various data concerning a printer 20 is updated at intervals in line with predetermined time intervals of periodic monitoring (i.e., by a timer).

If a communication error occurs on the LAN 30 or the like during display of a printer data page screen 200b, i.e., during periodic monitoring of a printer 20, a notification of the error occurrence is displayed on a status information field 203. The remaining data is however the same as that displayed prior to the error occurrence.

In the management system 1 of the first embodiment having the configuration as described above, the state data obtaining section 14 in the management system 10 sends a request to send state data to each printer 20 at regular intervals. In response to the request, each printer 20 sends the management server 10 state data.

In the management server 10, the state data obtaining section 14 receives state data from each printer 20, and the display controller 12 obtains, on the basis of the received state data, information representing functions and a state of the printer 20 from the retaining section 15 and creates a printer list screen 200a and a printer data page screen 200b, which are to be displayed on the monitor 11.

Hereinafter, description will be made in relation to a succession of procedural steps carried out when a new printer 20d is connected to the LAN 30 in the management system 1 with reference to a flow diagram (steps S10 to S100) of FIG. 7.

When a new printer 20d is connected to the LAN 30, the connection recognizing section 18 in the management server 10 detects establishment of the connection of the printer 20d and obtains data to identify, for example, the type of the printer from the printer 20d (step S10).

The judging section 17 retrieves in (refers to) the management section 16 (or a database managed by the management section 16) (step S20) in order to judge whether or not a printer identical to the printer 20d, the connection establishment of which is recognized by the connection recognizing section 18, has been managed by the management section 16, in other words, whether or not an identical printer 20 has been registered by the management section 16 (step S30).

If the printer 20d newly connected is new and not registered in the management data (Yes route in step S30), the judging section 17 initializes a retry number counter by setting "0" (zero) in the counter.

The function data obtaining section 13 sends the new printer 20d a command of request for an information definition file (step S40). Upon receipt of the command of request for an information definition file from the function data obtaining section 13, the printer 20d sends the management server 10 (the function data obtaining section 13) definition information (an information definition file).

The function data obtaining section 13 judges whether or not the information definition file has been successfully obtained from the printer 20d (step S50). If the result of the judgment is positive (Yes route in step S50), the management section 16 stores the obtained information definition file into the retaining section 15 (the management data, the database) (step S80).

The state data obtaining section 14 obtains the state data from the printer 20d. The display controller 12 displays the states and the function of the new printer 20d in the form of a printer list screen 200a or a printer data page screen 200b on the monitor 11, using the information definition file stored in the retaining section 15 (step S100) to complete the succession of procedural steps.

If a printer identical to the newly-connected printer 20d is managed by the management data (No route in step S30), the procedural steps shift from step S30 to step S100.

Conversely, if the result of the judgment in step S50 is negative (No route in step S50), a count of the number of retries is compared with a predetermined threshold value to judge whether or not the count of retry numbers is greater than the threshold value, i.e., whether or not the number of retries is over the threshold value (step S60). If the result of the judgment is negative (No route in step S60), the count of retry numbers is increased by one (+1) (step S70) and the procedural steps return to step S40.

On the other hand, if the result of the judgment is positive (Yes route in step S60), obtaining of the function data of the printer 20d is abandoned and is regarded as a management non-target. The succession of procedural steps inhibits display of data concerning the printer 20d (step S90) and terminates.

As described above, in the management system 1 of the first embodiment of the present invention, when a new printer 20d established a connection to the LAN 30, the state data obtaining section 14 obtains function data of the printer 20d through the LAN 30 even if the printer 20d possesses different functions from those possessed by other printers 20 managed by the management server 10. Therefore, the management system 1 provides greater advantages because the system manager does not cope with a complex installation operation and an operation for such as version up (capturing) the management software for the printer 20d.

Further, the printer 20d retains function data corresponding to a novel function thereof, and the function data obtaining section 13 obtains and uses the stored function data so that manufacturers that provide the management system 1 (management software) do not have to update the management software to catch up with a novel function each time a printer with a novel function is put on the market. It is therefore possible to reduce cost for development and maintenance.

Further, the present invention should by no means be limited to the foregoing embodiment, and various changes or modifications may be suggested without departing from the gist of the invention.

For example, all the printers 20a, 20b, 20c and 20d in the first embodiment are network printers connected to the management server 10 through the LAN 30 but should by no means be limited to network printers. Alternatively, at least one of the printers 20a, 20b, 20c and 20d may be connected, by a USB (Universal Serial Bus) cable or a printer cable (e.g., a Centronics cable), to a PC (Personal Computer) that is communicably connected to the management server 10 through the LAN 30, so that the at least one printer is connected to the management server 10 via the PC and the LAN 30, or at least one of the printers may be directly connected to the management server 10 by a USB cable or a printer cable.

In the above first embodiment, description is made in relation to the case where the management server 10 manages each printer 20, but the present invention should by no means be limited to this. As an alternative, the present invention may manage a state of an output device of another kind, such as a plotter, or manage an electronic device other than an output device, which device is exemplified by an electronic device used as a computer peripheral device or a home electrical appliance.

Figure 7:
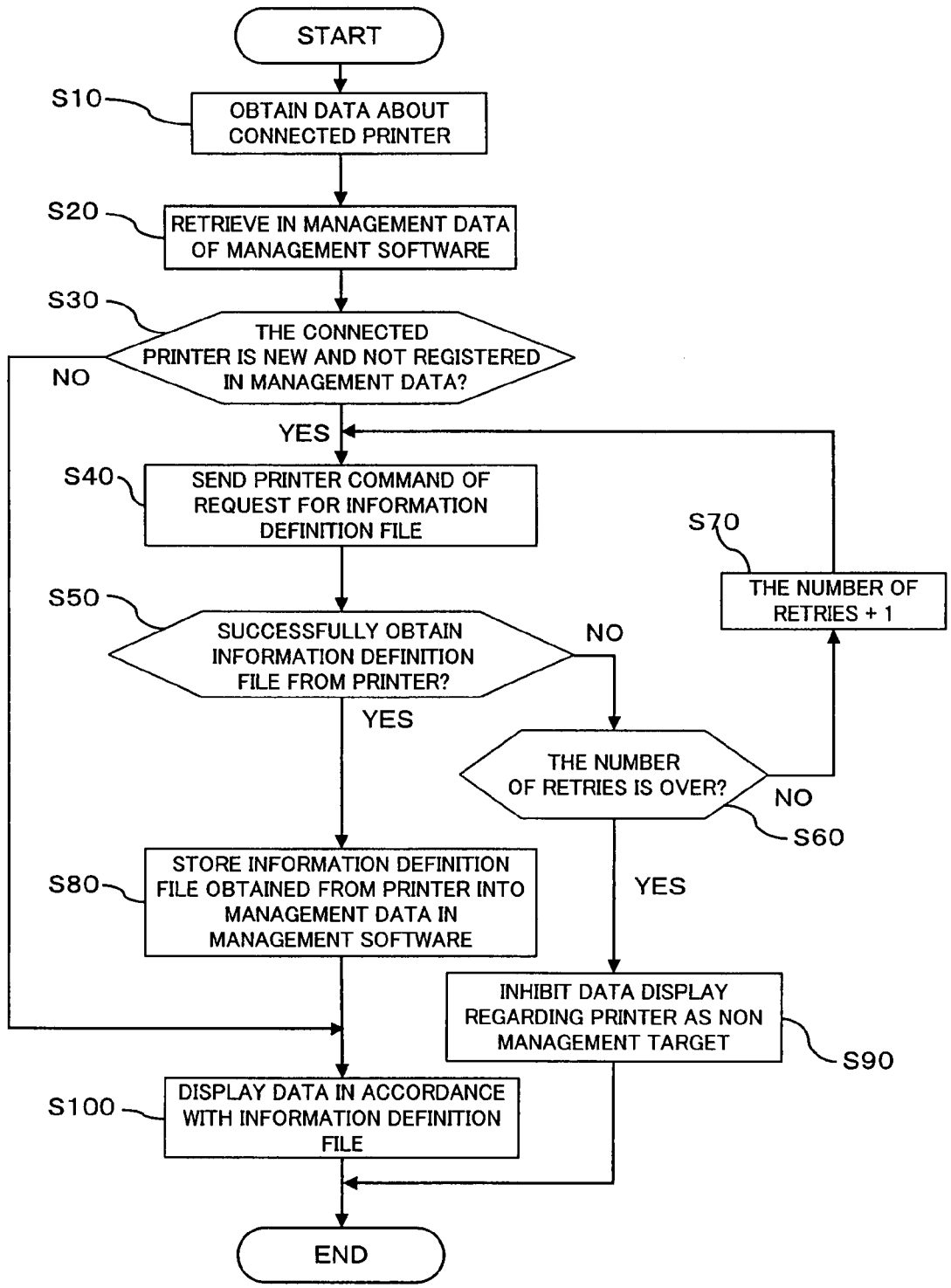
FIG. 7 is a flow diagram illustrating a succession of procedural steps carried out when a new printer is connected to a LAN in the management system of FIG. 1.
Figure 8:
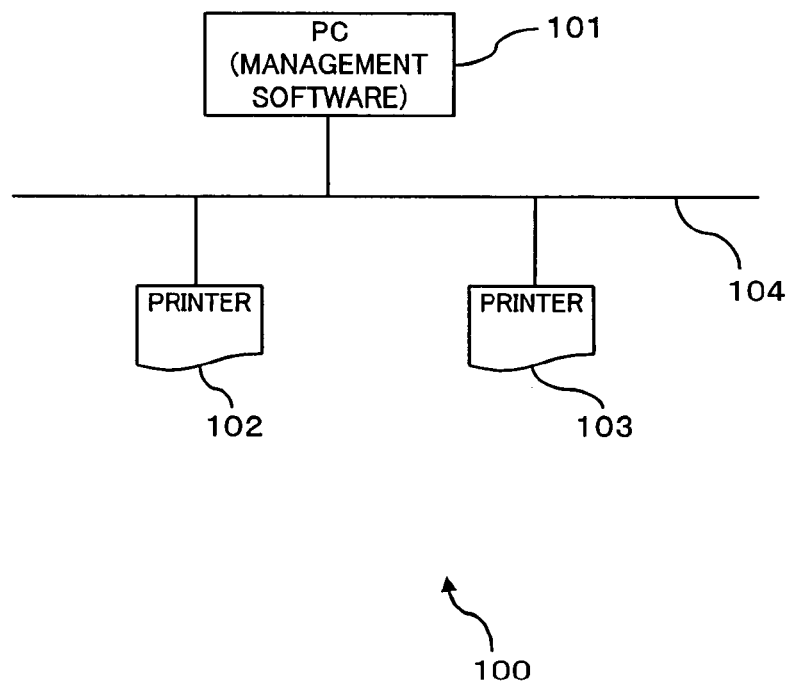
FIG. 8 is a diagram showing a configuration of a conventional management system.
Figure 11:
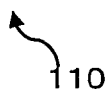
FIGS. 11 and 12 are tables respectively illustrating examples of screens displayed in the conventional management system of FIG. 8.
Figure 12:
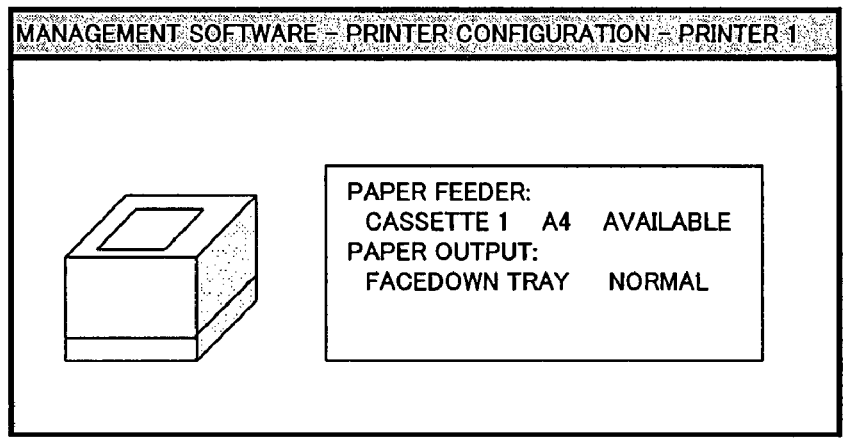
Figure 13:
FIGS. 13 and 14 are tables illustrating examples of screens displayed when a new printer with a novel function is connected to a network in the management system of FIG. 8.
Figure 14:
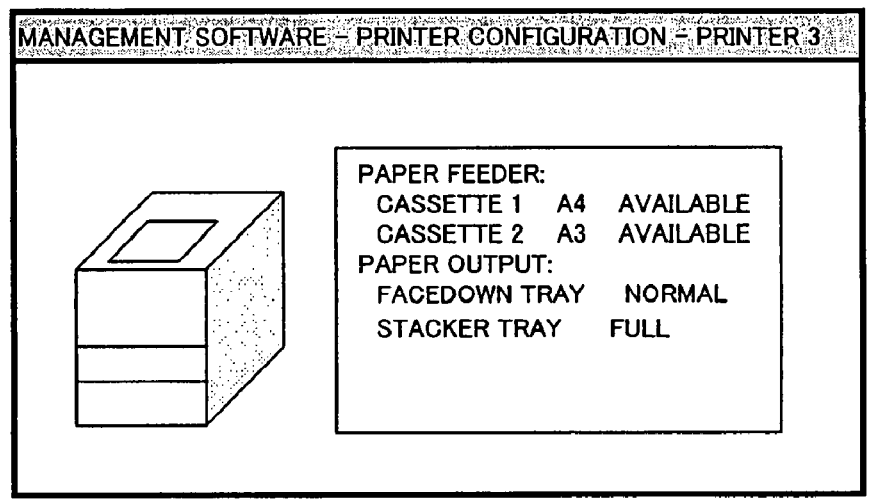
Figure 17:
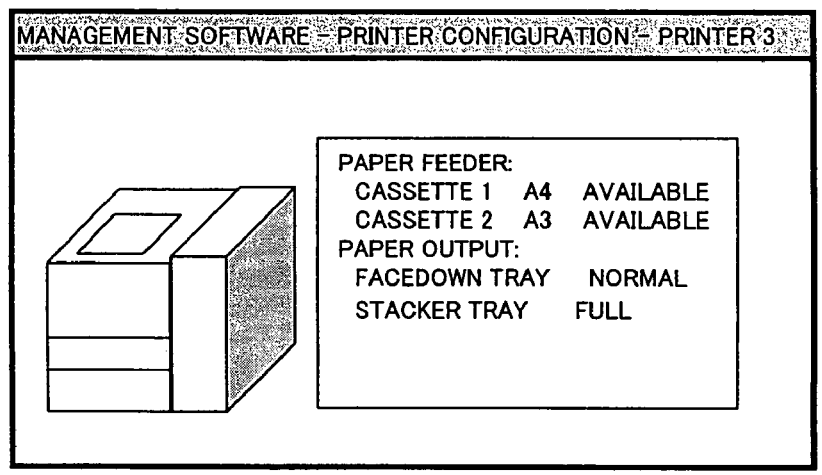
FIG. 17 is a table illustrating an example of a correct printer configuration data screen.

Further in the first embodiment, if the number of retries for attempt of obtaining function data of the new printer 20d becomes greater than the predetermined threshold value, the printer 20d is regarded as a management non-target in step S90 of the succession of procedural steps shown in FIG. 7 and display of information concerning the printer 20d in question is inhibited. But the present invention should by no means be limited to these operation manners. Alternatively, the printer 20d is managed by displaying information by using only function data stored in the retaining section 15 of the management server 10.

Still further, it is possible to apply the present invention to management of states and functions of various electronic devices that can be connected to a communication network other than printers, which devices are exemplified by computer peripheral devices and home electrical appliances.

What is claimed is:

1. A state display apparatus for displaying a state of a respective electronic device which is communicably connected to said apparatus through a communication network on a monitor, comprising:

a function data obtaining section to obtain function data including data of images schematically illustrating functions of the respective electronic device possessed by the respective electronic device from the respective electronic device through the communication network and representing states of possession of an optional function in the respective electronic device;

a state data obtaining section to obtain state data indicating the state of the respective electronic device from the respective electronic device through the communication network;

a display controller to display, on the basis of said state data obtained by said state data obtaining section, information concerning the state of the respective electronic device on the monitor, using said function data;

a connection recognizing section to recognize a connection of an additional electronic device to said apparatus through the communication network, the additional electronic device storing function data including data of images schematically illustrating functions possessed by the additional electronic device;

a management section to manage the respective electronic device and the additional electronic device, the connection of which as been recognized by the connection recognizing section, through the communication network; and a judging section judging whether or not the additional electronic device, the connection of which as been recognized by the connection recognizing section, is identical to the respective electronic device, wherein if it is judged by the judging section that the additional electronic device is identical to the respective electronic device, the display controller displays, on the basis of state data of the additional electronic device obtained by the state data obtaining section from the additional electronic device over the communication network, information concerning the state of the additional electronic device on the monitor, using the function data obtained from the respective electronic device, and if it is judged by the judging section that the additional electronic device is not identical to the respective electronic device, the display controller displays, on the basis of state data of the additional electronic device obtained by the state data obtaining section from the additional electronic device over the communication network, information concerning the state of the additional electronic device on the monitor, using function data obtained from the additional electronic device by the function data obtaining section through the communication network.

2. A state display apparatus according to claim 1, further comprising a retaining section to retain function data obtained by said function data obtaining section.

3. A state display apparatus according to claim 1, wherein the respective electronic device and the additional electronic device are output devices.

4. A management system comprising:
   a respective electronic device including
      a function data retaining section to retain function data including data of images schematically illustrating functions of the respective electronic device,
      a function data sending section to send said function data retained in said function data retaining section, and
      a state data sending section to send state data indicating a state of said respective electronic device; and
   a state management apparatus communicably connected to said respective electronic device through a communication network, the state management apparatus including
      a monitor,
      a function data obtaining section to receive said function data sent by the function data sending section through the communication network,
      a state data obtaining section to receive the state data indicating the state of the respective electronic device sent by the state data sending section through the communication network,
      a display controller to display, on the basis of said state data received by said state data obtaining section, information concerning the state of the respective electronic device on said monitor, using said function data received by the function data obtaining section,
      a connection recognizing section to recognize a connection of an additional electronic device to the state management apparatus through the communication network, the additional electronic device storing function data including data of images schematically illustrating functions of the additional electronic device,
      a management section to manage the respective electronic device and the additional electronic device, the connection of which as been recognized by the connection recognizing section, through the communication network, and
      a judging section judging whether or not the additional electronic device, the connection of which as been recognized by the connection recognizing section, is identical to the respective electronic device, wherein
         if it is judged by the judging section that the additional electronic device is identical to the respective electronic device, the display controller displays, on the basis of state data of the additional electronic device obtained by the state data obtaining section from the additional electronic device over the communication network, information concerning the state of the additional electronic device on the monitor, using the function data obtained from the respective electronic device, and
         if it is judged by the judging section that the additional electronic device is not identical to the respective electronic device, the display controller displays, on the basis of state data of the additional electronic device obtained by the state data obtaining section from the additional electronic device over the communication network, information concerning the state of the additional electronic device on the monitor, using function data obtained from the additional electronic device by the function data obtaining section through the communication network.

5. A management system according to claim 4, said state management apparatus further including a retaining section to retain function data obtained by said function data obtaining section.

6. A management system according to claim 4, wherein the respective electronic device and the additional electronic device are output devices.

7. A computer-readable recording medium in which a program for controlling state display so that a state of a respective electronic device which is communicably connected to a computer through a communication network is displayed on a monitor, wherein said program instructs the computer to function as:
   a function data obtaining section to obtain function data including data of images schematically illustrating functions of the respective electronic device possessed by the respective electronic device from the respective electronic device through the communication network and representing states of possession of an optional function in the respective electronic device;
   a state data obtaining section to obtain state data indicating the state of the respective electronic device from the respective electronic device through the communication network;
   a display controller to display, on the basis of said state data obtained by said state data obtaining section, information concerning the state of the respective electronic device on the monitor, using said function data;
   a connection recognizing section to recognize a connection of an additional electronic device to the computer through the communication network, the additional electronic device storing function data including data of images schematically illustrating functions possessed by the additional electronic device;
   a management section to manage the respective electronic device and the additional electronic device, the connection of which as been recognized by the connection recognizing section, through the communication network; and
   a judging section judging whether or not the additional electronic device, the connection of which as been recognized by the connection recognizing section, is identical to the respective electronic device, wherein
      if it is judged by the judging section that the additional electronic device is identical to the respective electronic device, the display controller displays, on the basis of state data of the additional electronic device obtained by the state data obtaining section from the additional electronic device over the communication network, information concerning the state of the additional electronic device on the monitor, using the function data obtained from the respective electronic device, and if it is judged by the judging section that the additional electronic device is not identical to the respective electronic device, the display controller displays, on the basis of state data of the additional electronic device obtained by the state data obtaining section from the additional electronic device over the communication network, information concerning the state of the additional electronic device on the monitor, using function data obtained from the additional electronic device by the function data obtaining section through the communication network.

8. A computer-readable recording medium according to claim 7, wherein the respective electronic device and the additional electronic device are output devices.

9. A method, comprising:

storing, inside a respective electronic device, a definition file of the respective electronic device and which includes images depicting optional functions of the respective electronic device;

obtaining, over a communication network, the definition file from the respective electronic device;

obtaining, over the communication network, status information from the respective electronic device indicating that a respective optical function of the optional functions is operational in the respective electronic device;

displaying a respective image of the images included in the obtained definition file that depicts the optional function indicated by the obtained status information;

judging whether or not an additional electronic device connected to the communication network is identical to the respective electronic device, the additional electronic device storing inside a definition file of the additional electronic device and which includes images depicting optional functions of the additional electronic device, and if it is judged by said judging that the additional electronic device is identical to the respective electronic device, displaying a respective image of the images included in the definition file obtained from the respective electronic device that depicts an optional function that is operational in the additional electronic device, and if it is judged by said judging that the additional electronic device is not identical to the respective electronic device, obtaining the definition file stored inside the additional electronic device from the additional electronic device over the communication network, and displaying a respective image of the images included in the definition file obtained from the additional electronic device that depicts an optional function that is operational in the additional electronic device.

* * * * *

UNITED STATES PATENT AND TRADEMARK OFFICE
CERTIFICATE OF CORRECTION

| | |
|---|---|
| PATENT NO. | : 7,574,658 B2 |
| APPLICATION NO. | : 11/136490 |
| DATED | : August 11, 2009 |
| INVENTOR(S) | : Kazumi Kisanuki |

It is certified that error appears in the above-identified patent and that said Letters Patent is hereby corrected as shown below:

Title Page, Item (57) (Abstract), Line 11, change "manger" to --manager--.

Signed and Sealed this

First Day of December, 2009

David J. Kappos
*Director of the United States Patent and Trademark Office*